United States Patent
Panesar et al.

(10) Patent No.: US 12,081,632 B2
(45) Date of Patent: Sep. 3, 2024

(54) CONTENT CUSTOMIZATION AND PRESENTATION BASED ON USER PRESENCE AND IDENTIFICATION

(71) Applicant: Apple Inc., Cupertino, CA (US)

(72) Inventors: Parry Panesar, San Jose, CA (US); Tanu Singhal, San Jose, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 17/956,765

(22) Filed: Sep. 29, 2022

(65) Prior Publication Data

US 2023/0208932 A1 Jun. 29, 2023

Related U.S. Application Data

(60) Provisional application No. 63/293,632, filed on Dec. 23, 2021.

(51) Int. Cl.
*H04L 67/50* (2022.01)
*G06F 16/9535* (2019.01)

(52) U.S. Cl.
CPC ........ *H04L 67/535* (2022.05); *G06F 16/9535* (2019.01)

(58) Field of Classification Search
CPC ............................. H04L 67/535; G06F 16/9535
See application file for complete search history.

(56) References Cited

U.S. PATENT DOCUMENTS

| | | | | |
|---|---|---|---|---|
| 7,594,189 B1 * | 9/2009 | Walker | ................... | G06Q 30/02 715/811 |
| 8,887,048 B2 * | 11/2014 | Nordhagen | ......... | G06F 16/4393 715/726 |
| 9,047,054 B1 * | 6/2015 | Goldstein | ............. | H04L 67/535 |
| 10,148,986 B2 * | 12/2018 | Mikan | ................ | H04N 21/8186 |

(Continued)

FOREIGN PATENT DOCUMENTS

| | | | | |
|---|---|---|---|---|
| AU | 2006335156 A1 * | 8/2008 | ............. | H04L 67/04 |
| CA | 2619773 A1 * | 3/2007 | ......... | G06F 16/9535 |

(Continued)

OTHER PUBLICATIONS

Extended European Search Report from European Patent Application No. 22213859.6, dated Apr. 28, 2023, 8 pages.

*Primary Examiner* — Shahid K Khan
(74) *Attorney, Agent, or Firm* — BAKERHOSTETLER

(57) ABSTRACT

The subject technology provides for customizing or personalizing and presenting content based on user presence and identification. The disclosed techniques may include obtaining, at a media device, identification information of a present user, who is present in a predefined space around the media device, and determining whether the identification information of the present user is associated with identification information pre-configured at the media device. Based on a determination that the present user's identification information is associated with the device user's identification information, sending a content request to a data source for digital content related to the present user. The requested digital (Continued)

content may be received and personalized at the media device. A personalized portion of the digital content may be provided from the content pool for rendering using an output device.

21 Claims, 5 Drawing Sheets

(56) References Cited

U.S. PATENT DOCUMENTS

| | | | | |
|---|---|---|---|---|
| 2007/0024580 A1* | 2/2007 | Sands | | G06Q 30/02 |
| | | | | 345/156 |
| 2007/0112761 A1* | 5/2007 | Xu | | G06F 16/313 |
| | | | | 707/999.005 |
| 2008/0004950 A1* | 1/2008 | Huang | | G06Q 30/0271 |
| | | | | 705/14.66 |
| 2008/0109843 A1* | 5/2008 | Ullah | | H04N 21/812 |
| | | | | 725/34 |
| 2008/0117201 A1* | 5/2008 | Martinez | | G06F 16/437 |
| | | | | 345/418 |
| 2008/0140518 A1* | 6/2008 | Grosz | | G06Q 30/0256 |
| | | | | 705/14.54 |
| 2010/0023506 A1* | 1/2010 | Sahni | | G06F 16/9535 |
| | | | | 707/E17.014 |
| 2010/0071003 A1* | 3/2010 | Bychkov | | G06Q 30/02 |
| | | | | 725/141 |
| 2011/0288913 A1* | 11/2011 | Waylonis | | G06Q 30/02 |
| | | | | 715/764 |
| 2012/0170817 A1* | 7/2012 | Yang | | G06V 20/59 |
| | | | | 382/118 |
| 2016/0021423 A1* | 1/2016 | Varga | | H04H 60/45 |
| | | | | 725/11 |
| 2016/0072915 A1* | 3/2016 | Decanne | | G06F 3/147 |
| | | | | 715/728 |
| 2016/0110585 A1* | 4/2016 | Govindaraj | | H04N 7/185 |
| | | | | 382/118 |
| 2016/0182950 A1* | 6/2016 | Robinson | | H04N 21/4415 |
| | | | | 725/28 |
| 2016/0217493 A1* | 7/2016 | Birch | | H04N 7/163 |
| 2016/0253710 A1* | 9/2016 | Publicover | | H04W 4/21 |
| | | | | 705/14.66 |
| 2017/0060508 A1* | 3/2017 | Österberg | | H04W 4/02 |
| 2018/0288567 A1* | 10/2018 | Maloney | | H04L 67/54 |
| 2021/0400344 A1* | 12/2021 | Kannan | | H04N 21/4586 |

FOREIGN PATENT DOCUMENTS

| | | | | | |
|---|---|---|---|---|---|
| CN | 103309927 A | * | 9/2013 | | G06F 16/9535 |
| DE | 102017200423 A1 | * | 7/2017 | | G06F 16/438 |
| EP | 3629200 A1 | * | 4/2020 | | G06F 16/24575 |
| GB | 2439843 A | * | 1/2008 | | G06F 17/30675 |
| TW | 1422504 B | * | 1/2014 | | |
| WO | WO-0070504 A2 | * | 11/2000 | | G06F 16/9535 |
| WO | WO-2008063987 A2 | * | 5/2008 | | G06F 16/436 |
| WO | WO-2009146087 A1 | * | 12/2009 | | G06F 17/30702 |
| WO | WO-2015155495 A1 | * | 10/2015 | | G06F 17/30867 |

* cited by examiner

CONTENT CUSTOMIZATION AND PRESENTATION BASED ON USER PRESENCE AND IDENTIFICATION

CROSS REFERENCE TO RELATED APPLICATIONS

This application claims the benefit of priority to U.S. Provisional Patent Application No. 63/293,632, filed on Dec. 23, 2021, the disclosure of which is hereby incorporated herein in its entirety.

TECHNICAL FIELD

The present description relates generally to techniques for customizing digital content, and, more particularly, for example, to techniques for customizing or personalizing digital content based on user presence and identification.

BACKGROUND

Some electronic media devices support providing a passive experience by retrieving and presenting, e.g., on a display device, generic content in the form of a screensaver when the media device is in a dormant state. The generic content is not personalized or customized for a particular user, and may be presented irrespective of whether or not a user is present in the vicinity of the media device to experience the generic content.

BRIEF DESCRIPTION OF THE DRAWINGS

Certain features of the subject technology are set forth in the appended claims. However, for purpose of explanation, several aspects of the subject technology are set forth in the following figures.

DETAILED DESCRIPTION

Figure 1:
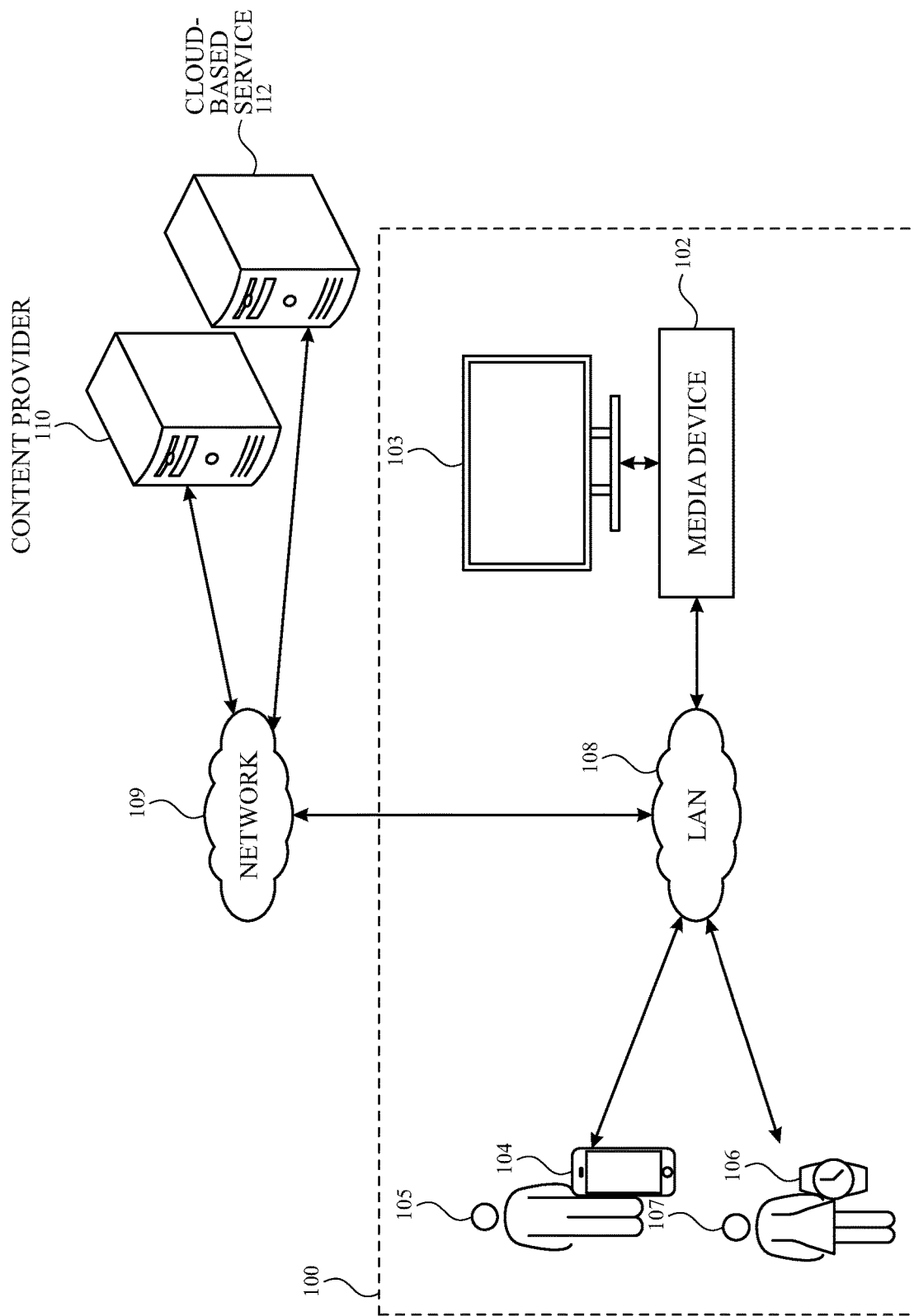
FIG. 1 illustrates an example environment including various electronic devices that may implement the subject system in accordance with one or more implementations.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

The subject technology provides for customizing or personalizing and presenting content based on user presence and identification. The disclosed techniques may include obtaining, at a media device, identification information of a present user, who is present in a predefined space around the media device, and determining whether the identification information of the present user is associated with identification information pre-configured at the media device (e.g., identification information of a device user logged-in at the media device). Based on a determination that the present user's identification information corresponds to the identification information pre-configured at the media device, sending a content request to a data source for digital content related to the present user. The requested digital content may be received and personalized at the media device, and a content pool including a personalized portion of the digital content may be created. The personalized portion of the digital content may be provided from the content pool for rendering using an output device.

An example architecture of the subject technology includes, for example, three modules implemented at the media device—a discovery module, a builder module, and a rendering module. In some implementations, the discovery module detects and identifies users who are in the vicinity of the media device based, e.g., on devices (phones, tablets, watches, etc.) detected in the vicinity. If the identified user(s) is/are the same user or related to the user who is signed-in at the media device, the builder module queries a content data source (e.g., a media library of the signed-in user) for content (e.g., digital photos) of the identified user(s). Alternatively, the builder module may query a content data source for content (e.g., digital photos) of an identified user, if the identified user is not the user signed-in at the media device but has an account setup at the media device such that the identified user's profile is stored at the media device.

Taking the example in which the content includes digital photos, in some implementations, the builder module receives a set of photos, personalizes the photo set for the identified user(s) by assigning each photo a relevance score and filtering or prioritizing the set based on the relevance score. The builder module adds the filtered set of photos in a pool, and in response to a request from the rendering module, provides a randomized filtered set of photos (called a "build") to the rendering module. The filtering of the photos is based on various factors such as whether there are other un-identified users in the vicinity along with the identified user(s), metadata associated with the photos, contextual information (e.g., holiday season), any pre-configuration related to sharing of photos set by the user(s), etc.

In some implementations, the rendering module formats the randomized filtered set of photos from the builder module, e.g., creates a personalized slideshow of the set of photos, and outputs the slideshow to a display device (e.g., a television) to display as a screensaver on the television. If the identified user is detected to be no longer present in the vicinity of the media device, the rendering of the personalized slideshow may be immediately terminated and replaced with default generic images to be displayed as the screensaver on the display device.

FIG. 1 illustrates an example network environment 100 that includes various devices in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes a media device 102 (signed-in with a device user's login credentials), a display device 103, a user device 104 associated with a user 105, a user device 106 associated with a user 107, a local area network ("LAN") 108, a network 109, a content provider 110, and a cloud-based service 112. The number and types of devices and their arrangement depicted in the network environment 100 is not meant to be restrictive; the network environment 100 may include any number of users and any number and other types of media devices, user devices, display devices, portable devices, and content providers, and/or other computing devices and input/output devices, any of which may be connected directly or indirectly using any of different network technologies with other devices and components of the network environment 100 in a manner that is different from the depiction of FIG. 1.

Content provider 110 may provide access, via network 109, to content such as streaming content (e.g., video content, audio content) or other subscription-based content (e.g., electronic book content or the like) to the media device 102 and/or to user devices (e.g., to one or more of the user devices 104, 106) that are associated with a user account that has been established with the content provider 110. Cloud-based service 112 may provide access to cloud-based storage, content (e.g., photos, videos, calendar information, etc.) stored in the cloud-based storage, applications (e.g., gaming applications, streaming applications, and/or any other application) to the media device 102 and/or to user devices (e.g., to one or more of the user devices 104, 106) that are associated with a user account that has been established with the cloud-based service 112. Device users of the media device 102 and/or user devices (e.g., one or more of the user devices 104, 106) may provide authentication information (e.g., a combination of username and password, biometric information, gesture-based information, etc.) to that device, to log that device into one or more accounts that are maintained for that device user at one or more of the content provider 110 and/or the cloud-based service 112.

For example, the media device 102 may be logged into a user account of a device user with cloud-based service 112 or another server. In an exemplary operational scenario, the device user may also have logged into a user account with content provider 110 using an application for the content provider installed on the media device 102. In some implementations, for a device user, the same authentication information may be used by the media device 102 to login into the device user's accounts at both the content provider 110 and the cloud-based service 112. The authentication information of the device user logged into at the media device 102 (to access the content provider 110 or the cloud-based service 112) may be stored in a memory device at the media device 102.

In some implementations, the media device 102 is in a dormant state if, e.g., the media device 102 is not being used or executing an application to access streaming content from the content provider 110 or to provide streaming content to the display device 103. In such a dormant state, however, the media device 102 may still be able to communicate with other devices (e.g., the user devices 104, 106, the display device 103) and servers (e.g., the cloud-based service 112) to access content related to the device user logged-in at the media device 102 and implement content personalization and presentation techniques provided in the subject disclosure.

The media device 102 may be a digital media player and may include one or more application (installed in a memory of the media device 102) using which a device user of the media device 102 may access (based on the device user's authentication information) streaming media content such as streaming music and/or video content from, e.g., the content provider 110. The media device 102 may also be able to access, using the device user's authentication information, the device user's content (e.g., photos) stored at the cloud-based service 112. The media device 102 may provide digital media content (e.g., photos, animation, streaming audio and video, etc.) obtained from the content provider 110 and/or the cloud-based service 112 to the display device 103, which may be operationally connected with or integrated into the media device 102.

In some implementations, for each device user's account, the media device 102 and the cloud-based service 112 may also store identification information of the device user and one or more other users who have been predetermined or pre-identified as being associated with the device user. For example, such other users may be family members, friends, colleagues, co-workers, etc. of the device user who are pre-identified as such, e.g., by the device user. The relationship information and identification information for each of the device user and other associated users may be stored at the media device 102 and the cloud-based service 112. The identification information for each user may include name, address, age, relationship of the user with one or more of other users, one or more devices of the user, username/tag/handle of the user, a token associated with the user, a user account identifier associated with the user, etc.

In some implementations, the media device 102 may be, for example, a portable computing device such as a laptop computer, a smartphone, a smart speaker, a peripheral device (e.g., a digital camera, headphones), a tablet device, a wearable device such as a smartwatch or a band, a connected home device, such as a wireless camera, a router and/or wireless access point, a wireless access device (e.g., a door lock), a smart thermostat, smart light bulbs, home security devices (e.g., motion sensors, door/window sensors, etc.), smart outlets, smart switches, and the like, or any other appropriate device that includes and/or is communicatively coupled to, for example, one or more wired or wireless interfaces, such as WLAN radios, cellular radios, Bluetooth radios, Zigbee radios, near field communication (NFC) radios, ultra-wideband (UWB) and/or other wireless radios. The media device 102 may be, and/or may include all or part of, the device discussed below with respect to FIG. 2, and/or the electronic system discussed below with respect to FIG. 5.

By way of example, in FIG. 1, the display device 103 is depicted as a television or monitor. However, this depiction of the display device 103 is not meant to be limiting, and in general, the display device 103 may itself be implemented as a media device capable of receiving, processing and rendering audio, image, and video content from, e.g., the content provider 110 and/or the cloud-based service 112 for a device user logged-in directly at the display device 103. The display device 103 may be, and/or may include all or part of, the device discussed below with respect to FIG. 2, and/or the electronic system discussed below with respect to FIG. 5.

The example network environment 100 may represent a specific physical space, e.g., a room in a house where the present user 105 and the present user 107 may be physically present. With respect to the techniques disclosed herein, the media device 102 may be configured such that any user detected to be present within the same predefined physical space (e.g., the room) where the media device 102 is located is considered to be in the "vicinity" of the media device 102. As such, as shown in FIG. 1, the present user 105 and the present user 107 are considered as being present in a predefined physical space around the media device 102 and thus in the vicinity of the media device 102.

Further, as shown in FIG. 1, the present user 105 may be carrying the user device 104 (depicted as a smartphone) and the present user 107 may be wearing the user device 106 (depicted as a smartwatch). In some implementations, each of the user devices 104 and 106 may be logged-in into using the respective user's authentication information (e.g., username and password, biometric information, gesture-based information, etc.). Further, the user devices 104 and 106 may store in a memory device thereof identification information of the present users 105 and 107, respectively. The identification information may include name, address, age, relationship of the user with one or more of other users, one or more devices of the user, username/tag/handle of the user, etc. The user devices 104 and/or 106 may also store in the memory device content (e.g., photos, videos, messages, animation, etc.) and a copy of such content may or may not be stored at a cloud-based service (e.g., cloud-based service 112) under the respective user's account.

The user devices 104 and 106 may be communicatively and operationally connected to the media device 102, e.g., via the LAN 108. For example, with respect to the techniques of the subject disclosure, while the media device 102 is in a dormant state (i.e., is not being used or executing an application to access streaming content from the content provider 110 or to provide streaming content to the display device 103), the user devices 104 and 106 may communicate with the media device 102 to share, e.g., identification information related to the present users 105 and 107, respectively. In some implementations, the user devices 104 and 106 may also be configured to share content locally stored thereon with each other and/or with other devices, e.g., the media device 102. In one implementation, the present user 105 of the user device 104 may be logged-in into at the media device 102 as the device user. In other words, in one example implementation, the present user 105 and the device user associated with the media device 102 are the same user.

In some implementations, each of the user devices 104 and 106 may be an electronic device, for example, a portable computing device such as a laptop computer, a smartphone, a smart speaker, a peripheral device (e.g., a digital camera, headphones), a tablet device, a wearable device such as a smartwatch or a band, a connected home device, such as a wireless camera, a router and/or wireless access point, a wireless access device (e.g., a door lock), a smart thermostat, smart light bulbs, home security devices (e.g., motion sensors, door/window sensors, etc.), smart outlets, smart switches, and the like, or any other appropriate device that includes and/or is communicatively coupled to, for example, one or more wired or wireless interfaces, such as WLAN radios, cellular radios, Bluetooth radios, Zigbee radios, near field communication (NFC) radios, ultra-wideband (UWB) and/or other wireless radios. The media device 102 may be, and/or may include all or part of, the device discussed below with respect to FIG. 2, and/or the electronic system discussed below with respect to FIG. 5.

Although not visible in FIG. 1 (see, e.g., FIG. 2 and/or FIG. 5), one or more of the media device 102 and the user devices 104 and 106 may include processing circuitry (e.g., including memory and/or one or more processors) and communications circuitry (e.g., one or more antennas, radio frequency circuits, etc.) for receiving and/or processing data, metadata, and/or media content from one or more of the other media device or user devices within or outside of the network environment 100. The processing circuitry may operate a speaker to generate sound according to the audio content and operate a display device to output an image or a video according to the image/video content.

In one or more implementations, the LAN 108 and/or the network 109 may include one or more different network devices/network medium and/or may utilize one or more different wireless and/or wired network technologies, such as Ethernet, optical, Wi-Fi, Bluetooth, Zigbee, Powerline over Ethernet, coaxial, Ethernet, Z-Wave, cellular, ultra-wideband (UWB) or generally any wireless and/or wired network technology that may communicatively couple two or more devices. In one or more implementations, the network 109 may be an interconnected network of devices that may include, and/or may be communicatively coupled to, the Internet.

In one or more implementations, the cloud-based service 112 may be configured to perform operations in association with user accounts such as: storing data (e.g., voice profiles, user settings/preferences, files such as documents and/or photos, etc.) with respect to user accounts, sharing and/or sending data with other users with respect to user accounts, backing up device data with respect to user accounts, and/or associating devices and/or groups of devices with user accounts.

One or more of the servers for content provider 110 and/or cloud-based service 112 may be, and/or may include all or part of the device discussed below with respect to FIG. 2, and/or the electronic system discussed below with respect to FIG. 5. Each of the content provider 110 and/or cloud-based service 112 may include one or more servers, such as a cloud of servers. For explanatory purposes, a single server is shown and discussed with respect to various operations for each of the content provider 110 and/or cloud-based service 112. However, these and other operations discussed herein may be performed by one or more servers, and each different operation may be performed by the same or different servers.

Figure 2:
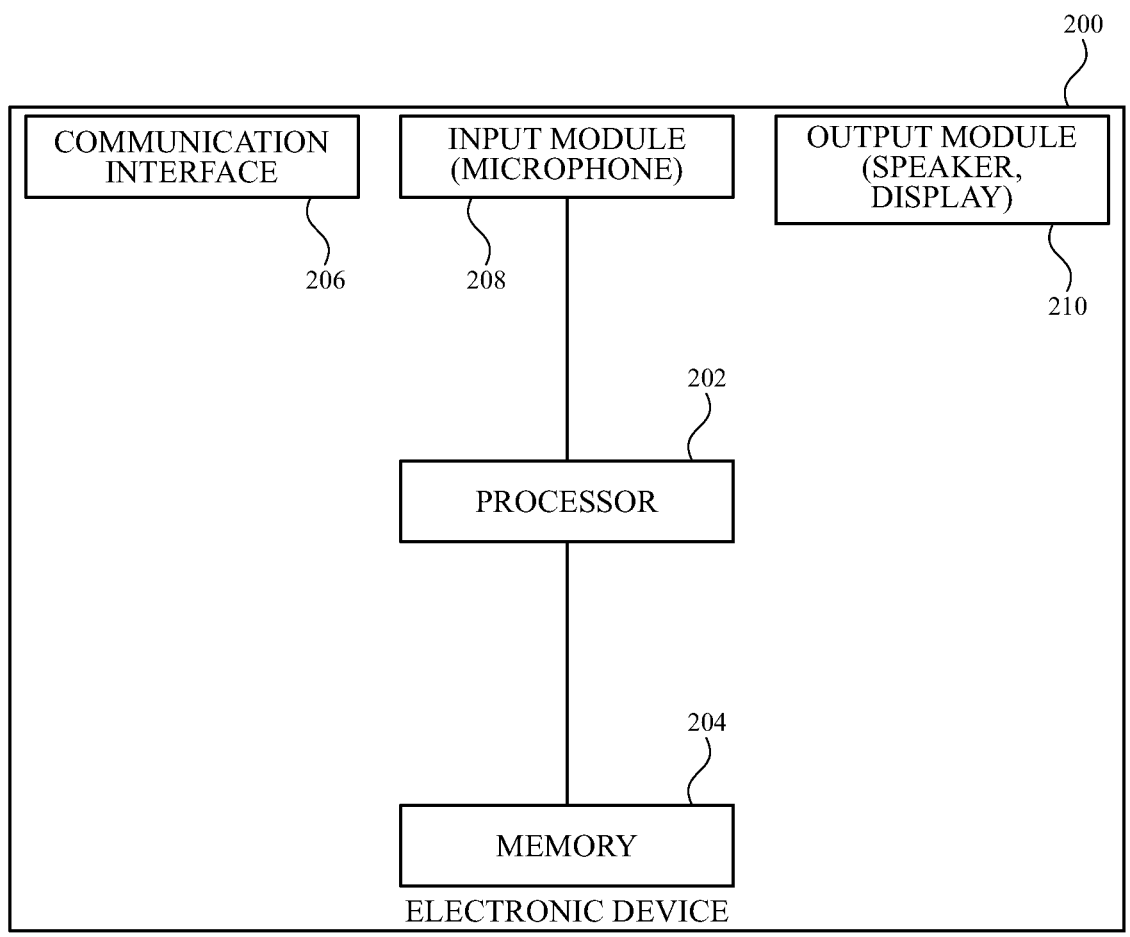
FIG. 2 illustrates an example device that may be implemented in the subject system in accordance with one or more implementations.

FIG. 2 illustrates an example device that may implement a system for any of the devices depicted in FIG. 1 in accordance with one or more implementations. Not all of the depicted components may be used in all implementations, and one or more implementations may include additional or different components than those shown in the figure. Variations in the arrangement and type of the components may be made without departing from the spirit or scope of the claims as set forth herein. Additional components, different components, or fewer components may be provided.

The device 200 may include a processor 202, a memory 204, a communication interface 206 and an input module 208, and an output module 210. The processor 202 may include suitable logic, circuitry, and/or code that enable processing data and/or controlling operations of the device 200. In this regard, the processor 202 may be enabled to provide control signals to various other components of the device 200. The processor 202 may also control transfers of data between various portions of the device 200. Additionally, the processor 202 may enable implementation of an operating system or otherwise execute code to manage operations of the device 200.

The memory 204 may include suitable logic, circuitry, and/or code that enable storage of various types of information such as received data, generated data, code, and/or configuration information. The memory 204 may include, for example, random access memory (RAM), read-only memory (ROM), flash, and/or magnetic storage. The memory 204 may store identification information of the user associated with the device 200 (e.g., logged-in at the device 200). The identification information may include name, address, age, relationship of the user with one or more of other users, one or more devices of the user, username/tag/handle of the user, etc. The memory 204 may also store content, e.g., photos, videos, messages, animation, etc. of the user associated with the device 200 (e.g., logged-in at the device 200).

The input module 208 may include suitable logic, circuitry, and/or code for capturing input, such as audio input (e.g., voice requests), remote control input, touchscreen input, keyboard input, etc. The output module 210 may include suitable logic, circuitry, and/or code for providing output, such as audio output (e.g., music), video output (e.g., a digital image or video), etc.

The communication interface 206 may include suitable logic, circuitry, and/or code that enables wired or wireless communication, such as between any of the devices shown in FIG. 1. The communication interface 206 may include, for example, one or more of a Bluetooth communication interface, a cellular interface, an NFC interface, a Zigbee communication interface, a WLAN communication interface, a USB communication interface, a ultra wideband (UWB) or generally any communication interface.

In one or more implementations, one or more of the processor 202, the memory 204, the communication interface 206, the input module 208, the output module 210 and/or one or more portions thereof, may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

Figure 3:
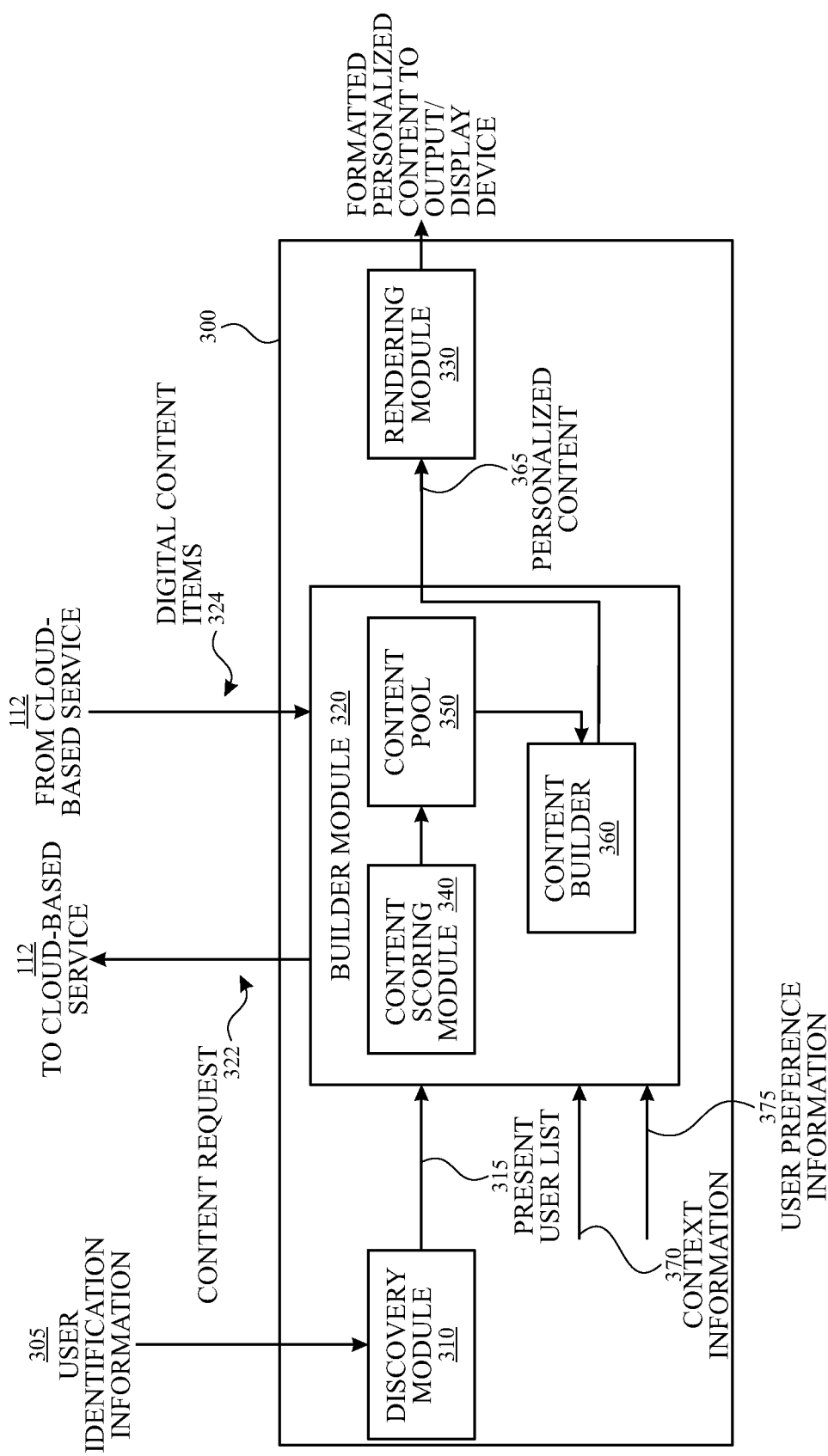
FIG. 3 illustrates an example system architecture that may be implemented in accordance with one or more implementations of the subject technology.

FIG. 3 illustrates an example system architecture 300 that may be implemented by the media device 102, in accordance with one or more implementations of the subject technology. For example, the system architecture 300 may implement techniques for customizing or personalizing and presenting content based on user presence and identification. For explanatory purposes, the system architecture 300 is described below as being implemented based on the components of the device 200, by using a processor and/or memory of the device 200. However, not all of the depicted components may be used in all implementations, and one or more implementations may include additional or different components than those shown in the FIG. 3.

Variations in the arrangement and type of the components may be made without departing from the spirit or scope of the claims as set forth herein. Additional components, different components, or fewer components may be provided. Various portions of the system architecture 300 can be implemented in software or hardware, including by one or more processors and a memory device containing instructions, which when executed by the processor cause the processor to perform the operations described herein. In the exemplary implementation shown in FIG. 3, the system architecture 300 includes a discovery module 310, a builder module 320, and a rendering module 330. In some implementations, the builder module 320 may include a content scoring module 340, a content pool 350, and a content builder 360.

In one or more implementations, the discovery module 310 detects and identifies users who are present in a predefined space around or in the vicinity of the media device 102 by detecting and identifying user devices in the vicinity of the media device. The predefined space may be represented in terms of a certain predefined distance from the media device 102. For example, the discovery module 310 may detect a user device as being present in the predefined space around the media device 102 based on strength or power level of a signal received from the user device. The power level may be measured in terms of a received signal strength indicator (RSSI) value, and if the discovery module 310 determines the RSSI value of a received signal from a user device is at least equal to a certain threshold value, the discovery module 310 detects that user device (and an associated user) to be present in the predefined space around or vicinity of the media device 102. In some implementations, the discovery module 310 may detect a user device as being present in the vicinity based on detecting user devices that are connected on a same network (e.g., the LAN 108, a Bluetooth network, etc.) as the media device 102.

In some implementations, the discovery module 310 may be configured with or utilize a discovery application that sends (e.g., broadcast) a discovery request for identification information such that any recipient users devices in the vicinity may respond with requested information. For example, the discovery module 310 may send such a discovery request to the user devices 104 and 106. In response, each of the user devices 104 and 106 (being detected as present in the vicinity) may send identification information 305 related to their logged-on present users 105 and 107, respectively to the media device 102. The identification information 305 may include the user device's information, e.g., a MAC address, a device ID, a serial number, a device's name tag, etc. Further, the identification information may include account/profile information of the associated present user (who is logged-in at the user device), e.g., the present user's name, address, age, relationship of the user with one or more of other users, one or more other devices of the present user, username/tag/handle of the present user, etc.

The discovery module 310 may compare the received identification information 305 from each of the user devices 104 and 106 with the identification information of a plurality of user accounts, the identification information stored locally at (or otherwise accessible to) the media device 102. If there is a match, the discovery module 310 identifies and records in a present user list 315 the identification information (e.g., a name or name tag) of the user device and the associated present user who is in the vicinity of the media device 102. If there is not a match, the discovery module 310 records in the list the user device (for which the identification information did not match) as a present but unidentified user device. As such, for an unidentified user device, no user is identifiable by the discovery module 310. For the example shown in FIG. 1, based on the identification information from the user device 104, the discovery module 310 may detect, identify, and record in the present user list 315 the present user 105 as a present and identified user in the vicinity of the media device 102. The discovery module 310 may send the present user list 315 to the builder module 320 for further processing in accordance with the techniques disclosed herein.

In an alternative embodiment, the discovery module 310 detects and identifies users who are present in a predefined space around or in the vicinity of the media device 102 based on information provided by, e.g., one or more audio/video capturing devices included within, or communicatively coupled to, the media device 102. The audio/video capturing devices may include a camera, a facial recognition device, a gesture recognizing device, a radio-frequency identification (RFID) device, a microphone (e.g., to detect a voice of an individual), a biometric device, or any other device capable of detecting a presence of a user and communicating the detection information to the discovery module 310. The discovery module 310 may compare the detection information received from the audio/video capturing device(s) with the identification information of a plurality of user accounts stored locally at or otherwise accessible by the media device 102, and if there is a match with information of one of the user accounts, confirms presence and identification of the user associated with the matched user account. The discovery module 310 may then record in the present user list 315, the identification information of the identified user (e.g., the present user 105), and send the present user list 315 to the builder module 320.

In some implementations, the builder module 320 receives the present user list 315 and determines whether the identification information of any of the present user(s) (e.g., the present user 105) in the present user list 315 is associated with identification information pre-configured at the media device 102, e.g., identification information of the device user operationally associated with (e.g., logged-in at) the media device 102. The builder module 320 may determine that the identification information of the present user 105 is associated with identification information of the device user if, for example, the name of the present user 105 matches the name of the device user. As such, the present user 105 and the device user are the same user. As another example, the builder module 320 may determine that the identification information of the present user 105 is associated with identification information of the device user if the present user 105's name matches the name of a related user who has a pre-established relationship with the device user. For example, a profile of the device user (stored locally at the media device 102 or at the cloud-based service 112) may provide information that the related user is a family member, friend, colleague, etc. of the device user and is authorized by the device user to share various data, information, and functionalities of one or more services and devices (including the media device 102) manufactured by a certain manufacturer or operated under a same set of operating systems.

In some implementations, based on a determination that the identification information of the present user 105 is associated with the identification information of the device user, the builder module 320 sends a content request 322 to a data source (e.g., at the cloud-based service 112) for digital content related to the present user 105. For example, the builder module 320 sends a content request 322 to the cloud-based service 112 to retrieve digital images, videos, animation, etc. from the device user's account (or a shared account of which the device user is a member) at the cloud-based service 112. In some implementations, the builder module 320 or the media device 102 may be configured to request and obtain digital content related to the present user 105 directly from the user devices 104 and 106 present in the vicinity of the media device 102. Responding to such a request, the present users 105 and/or 107 may select the requested digital content stored locally at, or otherwise accessible to, the respective user devices 104 and/or 106, and transmit the requested digital content from the user devices 104 and/or 106 to the media device 102. In some implementations, the user device 104 or 106 may automatically respond to the content request by selecting and transmitting (without user input) the requested content to the media device 102. The requested digital content may include a plurality of digital content items, each content item being an image, video, animation, etc. and having metadata related to the present user 105 and/or users related to the present user 105. For example, for digital images, the metadata may include names of people recognized in each digital image.

Responsive to the content request 322, the builder module 320 receives the digital content including digital content items 324, and personalizes the digital content using the content scoring module 340, the content pool 350 and the content builder 360 to obtain a personalized portion of the digital content. For example, the content scoring module 340 may assign a relevance score to each of the plurality of digital content items 324 based on one or more of metadata related to the respective digital content item 324, context information 370, and user preference information 375. For example, if the digital content items 324 are digital images, the metadata may include the names tagged to the image of people identified in the image, and as such, digital images having the present user 105's name tagged to them are given a higher relevance score by the content scoring module 340 as compared digital images not having the present user 105's name tagged therewith.

Further, the context information 370 may include information indicating presence of an unauthorized/unidentified user (e.g., the present user 107) in the predefined space (as indicated by the discovery module 310), a current time of the day, a current month, holiday season, particular dates of life events for the present user 105, etc. Based on the context information 370, the content scoring module 340 may assign a relatively higher or lower score to each digital content item 324. For example, if the present user 107 is determined to be an unidentified but present user by the discovery module 310, the content scoring module 340 may assign a relatively lower score to digital images that have the present user 105's name, such that photos of the present user 105's may not be eventually displayed in the presence of the unidentified present user 107. Further, if the current month is the birthday month of the present user 105, the content scoring module 340 may assign a relatively higher score to digital images taken on that the date in the prior years.

In some implementations, the content scoring module 340 may assign a relatively higher or lower score to each digital content item 324 based on the user preference information 375 provided by the present user 105 or the device user of the media device 102. For example, the present user 105 or the device user may want to only display higher resolution photos or photos taken before a certain year, and as such, the content scoring module 340 may assign a relatively higher score to digital images having resolution higher than a certain resolution value or photos taken prior to a predefined year, and vice-versa.

In some implementations, the content scoring module 340 may assess whether the relevance score of each of the plurality of digital content items 324 satisfies (e.g., the relevance score is higher than) a threshold score requirement, and discards or filters out the digital content items 324 that do not satisfy (e.g., the relevance score is lower than) the threshold score requirement (e.g., a constant number or value). For example, the relevance score of a digital content items 324 may considered to satisfy the threshold score requirement if the relevance score is higher than the threshold score requirement. Similarly, the relevance score of a digital content items 324 may considered to not satisfy the threshold score requirement if the relevance score is lower than the threshold score requirement. Further, in some implementations, the threshold score requirement may be a dynamic number or value, which may change based on one or more factors such as, for example, number of (identified and unidentified) people detected in the vicinity of the media device 102, how frequently certain users are detected and identified in the vicinity over a certain period of time, and/or other factors. After such content filtering, the content scoring module 340 may initialize the content pool 350 and provide the portion of the digital content items 324 that satisfy the threshold score requirement to the content pool 350. In some implementations, the content pool 350 may represent a storage space in a memory device at the media device 102 in which the portion of the digital content items 324 that satisfy the threshold score requirement are stored.

In some implementations, the rendering module 330 may receive from the discovery module 310 a trigger signal for displaying personalized content after the first instance of the discovery module 310 detecting and identifying the present user 105 in the vicinity of the media device 102. Responsive to such a trigger signal, the rendering module 330 may send a request to the content builder 360 for personalized content for the present user 105. To complete this request, the content builder 360 accesses the portion of the digital content items 324 at the content pool 350 and randomizes those content items to generate a build or set of personalized content items 365. The content builder 360 may then provide the set of personalized content items 365 to the rendering module 330.

In some implementations, the rendering module 330 formats the set of personalized content items 365, e.g., creates a personalized slideshow using the personalized photos from the content builder 360, and outputs or plays the slideshow to the display device 103 to display as a screensaver.

In some implementations, the discovery module 310 periodically performs the detection and identification of users in the vicinity of the media device 102. If the discovery module 310 initially detected but can no longer detect the present user 105 (based on a weak or no RSSI signal value from the user device 104, for example), the discovery module 310 may determine that the user device 104 and thus the present user 105 is no longer present within the predefined space. Accordingly, the discovery module 310 may update the present user list 315 to update that the present user 105 is no longer present within the predefined space. If the present user 105 was the only present user recorded in the present user list 315 and is determined to be no longer present, a lost signal indicating that no user is present in the predefined space around the media device is sent to the rendering module 330. Based on the lost signal, the rendering module 330 immediately terminates providing the personalized content items such that the rendering or displaying of the personalized content items on the display device 103 stops (e.g., the slideshow is terminated). The rendering module 330 may then start rendering on the display device 103 default generic images (i.e., content not related to the present user 105 or any other user) as a new screensaver. The generic images may be stored locally at the media device 102 or may be otherwise accessible to the system architecture 300.

Referring back to the initial determination done by the builder module 320, in some implementations, if the builder module 320 determines that the identification information of the present user 105 is not associated with the identification information of the device user, the builder module 320 sends a request to the rendering module 330 to output generic digital content, and the rendering module 330 provides generic digital content (e.g., generic images not related to any user) for rendering using the display device 103.

In some implementations, the discovery module 310 and the builder module 320 may apply the same techniques for the present user 107 as discussed above in reference to the present user 105. For example, while the present user 105 is still present in the predefined space, the discovery module 310 may obtain identification information 305 of the present user 107, the identification information identifying the present user 107 (and being indicative of the present user 107 being present in the predefined space around the media device 102). Accordingly, the discovery module 310 may update the present user list 315 to add the identification information (e.g., a name or name tag) of the user device and the associated present user 107. If the discovery module 310 is only able to detect the presence of the present user 107 but does not identify based on its identification information, the discovery module 310 records in the present user list 315 the user device 107 as a present but unidentified user device 107.

Further, the builder module 320 receive the updated present user list 315 and determines whether the identification information of the present user 107 is associated with the identification information pre-configured at the media device 102, e.g., identification information of the device user operationally associated with (e.g., logged-in at) the media device 102. If so, the builder module 320 may send a second content request to the cloud-based service 112 for updated digital content including digital content that is related to the present user 107, the present user 105, or both the present user 105 and the present user 107, e.g., digital images that have the names of both the present users 105 and 107 tagged therewith. The builder module 320 may receive and personalize the updated digital content using the content scoring module 340, and update the content pool 350 to include a personalized portion of the updated digital content. For example, the content scoring module 340 may assign a higher score to a digital content item that is related to both the present users 105 and 107 than a digital content item that relates to only one of the present users 105 and 107.

In some implementations, the content scoring module 340 may assess whether the relevance score of each digital content item 324 of the updated digital content satisfies (e.g., the score is higher than) the threshold score requirement, and discards or filters out the digital content items 324 that do not satisfy the threshold score requirement. After such content filtering, the content scoring module 340 may update the content pool 350 with the portion of the digital content items 324 of the updated digital content that satisfy the threshold score requirement.

In some implementations, after completing or toward the end of output of a slideshow, the rendering module 330 may send a request to the content builder 360 for another build or set of personalized content items 365. To complete this request, the content builder 360 accesses the portion of the digital content items 324 of the updated digital content at the (updated) content pool 350 and randomizes those content items to generate a new build or set of personalized content items 365. The content builder 360 may then provide the new set of personalized content items 365 to the rendering module 330. The rendering module 330 may format the new set of personalized content items 365, e.g., creates a new personalized slideshow, and outputs or plays the slideshow to the display device 103 to display as a screensaver.

Referring back to the builder module 320, in some implementations, if the builder module 320 determines that the identification information of the present user 107 is not associated with the identification information of the device user, the builder module 320 determines that no new content is to be requested for the present user 107 and the previously-received digital content related to the present user 105 is to be re-personalized or re-customized for a subsequent rendering by the rendering module 330. As such, the content scoring module 340 may or may not re-score and/or re-assess (with respect to the threshold score requirement) the digital content items 324, and update the content pool 350 accordingly.

After completing or toward the end of output of an initial slideshow, the rendering module 330 may send a request to the content builder 360 for another build or set of personalized content items 365. To complete this request, the content builder 360 accesses the portion of the digital content items 324 (related only to the present user 105) at the (updated) content pool 350 and randomizes those content items again to generate a new build or set of personalized content items 365. The content builder 360 may then provide the new set of personalized content items 365 to the rendering module 330. The rendering module 330 may format the new set of personalized content items 365, e.g., creates a new personalized slideshow, and outputs or plays the slideshow to the display device 103 to display as a screensaver.

In some implementation, the discovery module 310 detects that the present user 105 and/or the present user 107 are/is no longer present in the predefined space around the media device 102. Responsive to such determination, a lost signal may be generated indicating the personalized content at the content pool needs to be modified to align with the remaining present user. In some implementations, if the present user 105 is detected to be no longer present in the predefined space (and as such, the present user 107 is the only remaining user), the present user list 315 is updated accordingly, and based on the updated present user list 315, the builder module 320 sends another content request to the cloud-based service 112 to digital content related to the present user 107 (e.g., this content request may be for content related to the present user 107 and is silent with respect to the present user 105). In the same manner as discussed above, the digital content related to the present user 107 may be received and personalized, and the content pool 350 may be further updated to include a portion of the digital content items 324 related to the digital content of the present user 107. Again, responsive to a further request from the rendering module 330, the content builder 360 may generate another new build or set of personalized content items 365 from the updated content pool 350. The content builder 360 may then provide this new set of personalized content items 365 to the rendering module 330. The rendering module 330 may format the new set of personalized content items 365, e.g., creates a new personalized slideshow, and outputs or plays the slideshow to the display device 103 to display as a screensaver.

In some implementations, if the present user 107 is detected to be no longer present in the predefined space (and as such, the present user 105 is the only remaining user), the present user list 315 is updated accordingly, and based on the updated present user list 315, the builder module 320 may restore the content pool 350 to its initial state such that the content pool 350 includes the portion of the digital content items 324 related to the initially-received digital content for the present user 105. Again, responsive to a further request from the rendering module 330, the content builder 360 may generate another new/updated build or set of personalized content items 365 from the content pool 350 (that is restored to its initial state). The content builder 360 may then provide this new set of personalized content items 365 to the rendering module 330. The rendering module 330 may format the new set of personalized content items 365, e.g., creates a new personalized slideshow, and outputs or plays the slideshow to the display device 103 to display as a screensaver.

In some implementations, if the present user 105 likes a particular photo in the screensaver slideshow displayed on the display device 103 (and the present user 105 may not be aware that the photo belongs to the present user 107's account), the present user 105 may send a request for a copy of that photo from the user device 104 to the media device 102. Responsive to such a request, the media device 102 may send a message or notification back to the requesting user device 104, where the message or notification may include a link or instructions executing which the user device 104 may automatically generate and send a request for the photo to the user device 106 of the present user 107. The present user 107 may approve the request at the user device 106 and the user device 106 may share the photo with the user device 104. Alternatively, responsive to the request from the user device 104, the media device 102 may send a message or notification directly to the user device 106 requesting that the present user 107 shares the photo with the user device 104 for the present user 105. The present user 107 may approve the request from the media device 102 at the user device 106 and the user device 106 may share the photo with the user device 104.

Figure 4:
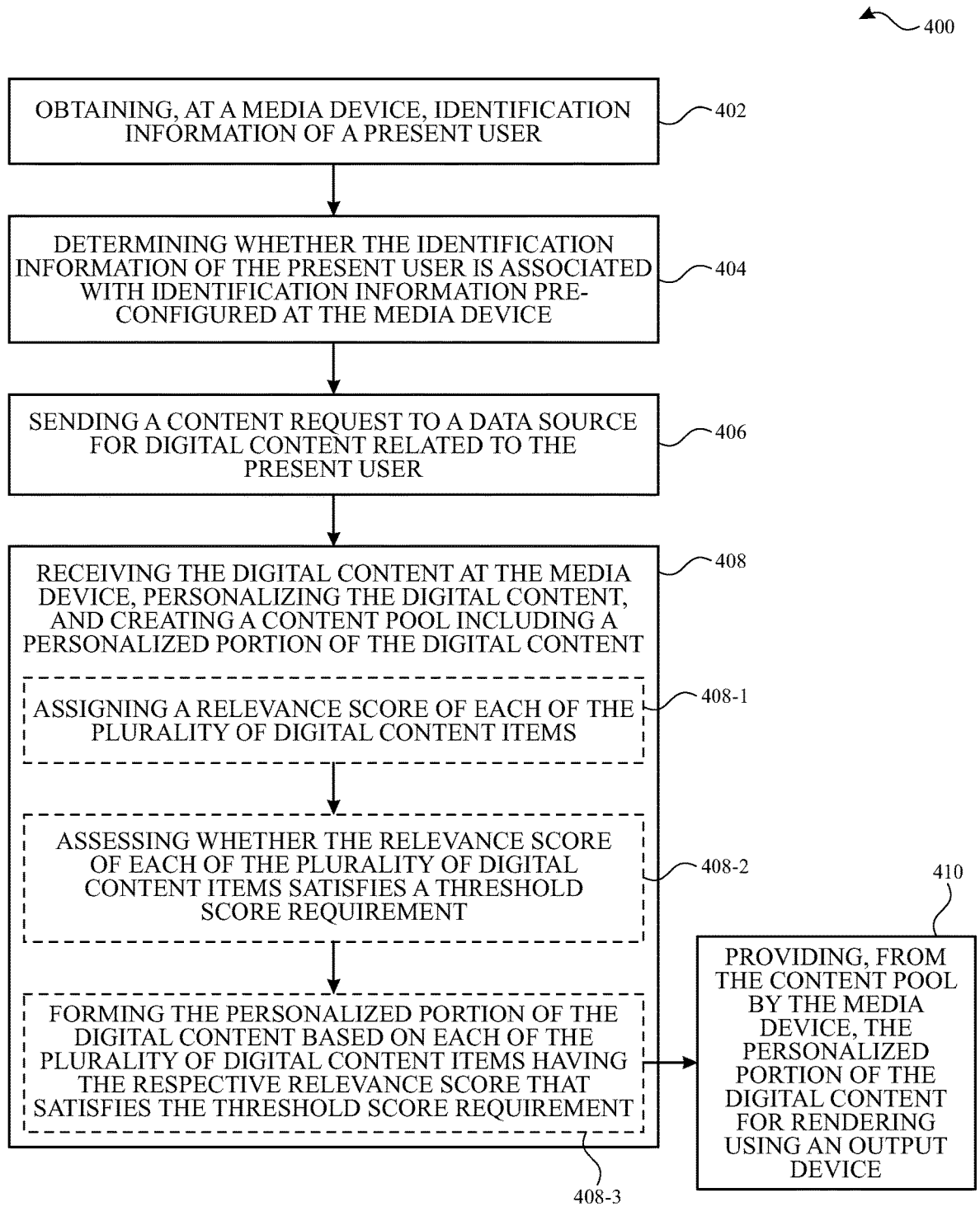
FIG. 4 illustrates a flow diagram for an example process in accordance with implementations of the subject technology.

FIG. 4 illustrates a flow diagram of an example process for customizing or personalizing and presenting content based on user presence and identification, in accordance with one or more implementations. For illustrative purposes, the process 400 is primarily described herein with reference to the system architecture 300 of FIG. 3. For illustrative purposes, the blocks of the process 400 are described herein as occurring in serial, or linearly. However, multiple blocks of the process 400 may occur in parallel. In addition, the blocks of the process 400 need not be performed in the order shown and/or one or more blocks of the process 400 need not be performed and/or can be replaced by other operations.

In operation 402, the process 400 includes obtaining, at the discovery module of the media device 102, identification information 305 of a present user 105, the identification information identifying the present user 105 (and being indicative of the present user 105 being present in a predefined space around the media device 102).

In operation 404, the process 400 includes determining, at the builder module 320, whether the identification information 305 of the present user 105 is associated with identification information pre-configured at the media device 102, e.g., identification information of a device user logged-in at the media device 102.

In operation 406, the process 400 includes, based on a determination that the identification information 305 of the present user 105 is associated with the identification information of the device user, sending a content request 322 to a data source (at the cloud-based service 112) for digital content related to the present user 105.

In operation 408, the process 400 includes, responsive to the content request 322, receiving the digital content including the digital content items 324 at the builder module 320 of the media device 102, personalizing the digital content items 324, and creating a content pool 350 including a personalized portion of the digital content items 324. The operation 408 may include operation 408-1, in which the process 400 includes assigning a relevance score to each of the plurality of digital content items 324 based on, for example, one or more of metadata related to the respective digital content item, information indicating presence of an unauthorized user (e.g., a user whose identification information is determined to be not associated with the identification information pre-configured at the media device) in the predefined space, and a configuration set by the device user. The operation 408 may include operation 408-2, in which the process 400 includes assessing whether the relevance score of each of the plurality of digital content items 324 satisfies a threshold score requirement. The operation 408 may include operation 408-3, in which the process 400 includes forming the personalized portion of the digital content based on each of the plurality of digital content items 324 having the respective relevance score that satisfies the threshold score requirement.

In operation 410, the process 400 includes providing, from the content pool 350 by the content builder 360 of the media device 102, the personalized portion of the digital content for rendering by the rendering module 330 at a display device 103.

As described above, one aspect of the present technology is the gathering and use of data available from specific and legitimate sources for training and/or operating machine learning models. The present disclosure contemplates that in some instances, this gathered data may include personal information data that uniquely identifies or can be used to identify a specific person. Such personal information data can include voice samples, voice profiles, demographic data, location-based data, online identifiers, telephone numbers, email addresses, home addresses, biometric data or records relating to a user's health or level of fitness (e.g., vital signs measurements, medication information, exercise information), date of birth, or any other personal information. The present disclosure recognizes that the use of such personal information data, in the present technology, can be used to the benefit of users. For example, the personal information data can be used for recognizing a trigger phrase or determining details of a media content request from a voice input from a user.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates aspects in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection and/or sharing of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level or at a scale that is insufficient for facial recognition), controlling how data is stored (e.g., aggregating data across users), and/or other methods such as differential privacy.

Therefore, although the present disclosure broadly covers use of personal information data to implement one or more various disclosed aspects, the present disclosure also contemplates that the various aspects can also be implemented without the need for accessing such personal information data. That is, the various aspects of the present technology are not rendered inoperable due to the lack of all or a portion of such personal information data.

Figure 5:
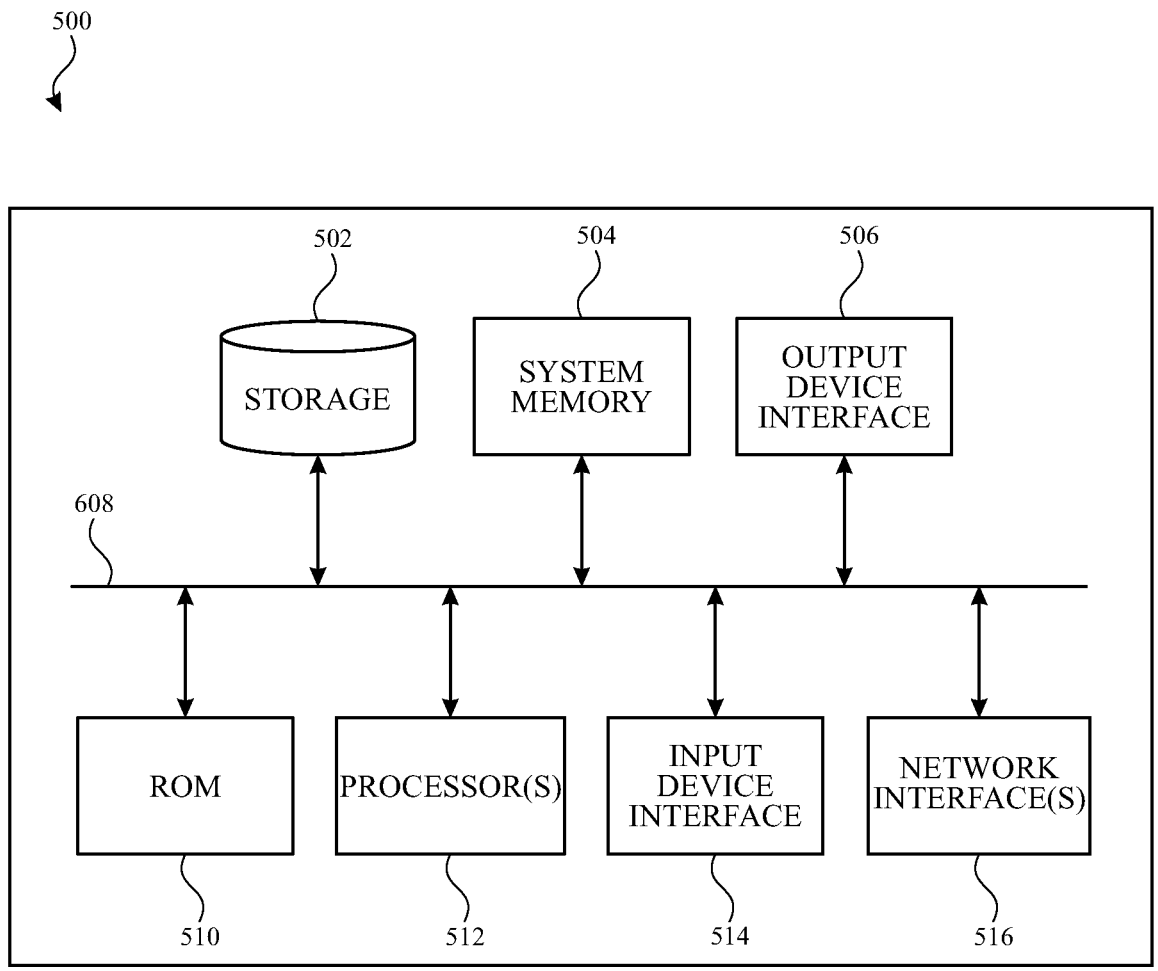
FIG. 5 illustrates an electronic system with which one or more implementations of the subject technology may be implemented.

FIG. 5 illustrates an electronic system 500 with which one or more implementations of the subject technology may be implemented. The electronic system 500 can be, and/or can be a part of any device or system, as shown in FIGS. 1-3. The electronic system 500 may include various types of computer readable media and interfaces for various other types of computer readable media. The electronic system 500 includes a bus 508, one or more processing unit(s) 512, a system memory 504 (and/or buffer), a ROM 510, a permanent storage device 502, an input device interface 514, an output device interface 506, and one or more network interfaces 516, or subsets and variations thereof.

The bus 508 collectively represents all system, peripheral, and chipset buses that communicatively connect the numerous internal devices of the electronic system 500. In one or more implementations, the bus 508 communicatively connects the one or more processing unit(s) 512 with the ROM 510, the system memory 504, and the permanent storage device 502. From these various memory units, the one or more processing unit(s) 512 retrieves instructions to execute and data to process in order to execute the processes of the subject disclosure. The one or more processing unit(s) 512 can be a single processor or a multi-core processor in different implementations.

The ROM 510 stores static data and instructions that are needed by the one or more processing unit(s) 512 and other modules of the electronic system 500. The permanent storage device 502, on the other hand, may be a read-and-write memory device. The permanent storage device 502 may be a non-volatile memory unit that stores instructions and data even when the electronic system 500 is off. In one or more implementations, a mass-storage device (such as a magnetic or optical disk and its corresponding disk drive) may be used as the permanent storage device 502.

In one or more implementations, a removable storage device (such as a floppy disk, flash drive, and its corresponding disk drive) may be used as the permanent storage device 502. Like the permanent storage device 502, the system memory 504 may be a read-and-write memory device. However, unlike the permanent storage device 502, the system memory 504 may be a volatile read-and-write memory, such as random access memory. The system memory 504 may store any of the instructions and data that one or more processing unit(s) 512 may need at runtime. In one or more implementations, the processes of the subject disclosure are stored in the system memory 504, the permanent storage device 502, and/or the ROM 510 (which are each implemented as a non-transitory computer-readable medium). From these various memory units, the one or more processing unit(s) 512 retrieves instructions to execute and data to process in order to execute the processes of one or more implementations.

The bus 508 also connects to the input and output device interfaces 514 and 506. The input device interface 514 enables a user to communicate information and select commands to the electronic system 500. Input devices that may be used with the input device interface 514 may include, for example, alphanumeric keyboards and pointing devices (also called "cursor control devices"). The output device interface 506 may enable, for example, the display of images generated by electronic system 500. Output devices that may be used with the output device interface 506 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 5, the bus 508 also couples the electronic system 500 to one or more networks and/or to one or more network nodes through the one or more network interface(s) 516. In this manner, the electronic system 500 can be a part of a network of computers (such as a LAN, a wide area network ("WAN"), or an Intranet, or a network of networks, such as the Internet. Any or all components of the electronic system 500 can be used in conjunction with the subject disclosure.

These functions described above can be implemented in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (also referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; e.g., feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; e.g., by sending web pages to a web browser on a user's client device in response to requests received from the web browser.

Aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

In accordance with aspects of the disclosure, a method is provided that includes obtaining, at a media device, identification information of a present user, who is present in a predefined space around the media device, and determining whether the identification information of the present user is associated with identification information pre-configured at the media device (e.g., identification information of a device user logged-in at the media device). Based on a determination that the present user's identification information is associated with the identification information pre-configured at the media device, sending a content request to a data source for digital content related to the present user. The requested digital content may be received and personalized at the media device, and a content pool including a personalized portion of the digital content may be created. The digital content may include includes a plurality of digital content items having metadata related to the present user. The digital content may be personalized by assigning a relevance score to each of the plurality of digital content items based on, for example, one or more of metadata related to the respective digital content item, information indicating presence of an unauthorized user in the predefined space, and a configuration set by the device user; assessing whether the relevance score of each of the plurality of digital content items satisfies a threshold score requirement; and forming the personalized portion of the digital content based on each of the plurality of digital content items having the respective relevance score that satisfies the threshold score requirement. The personalized portion of the digital content may be provided from the content pool for rendering using an output device.

In accordance with aspects of the disclosure, a device is provided that includes at least one processor, and a memory including instructions that, when executed by the at least one processor, cause the at least one processor to obtain identification information of a present user who is present in a predefined space around the device, the identification information identifying the present user, and determine whether the identification information of the present user is associated with identification information pre-configured at the device (e.g., identification information of a device user logged-in at the device). Based on a determination that the present user's identification information is associated with the identification information pre-configured at the device, sending a content request to a data source for digital content related to the present user. The requested digital content may be received and personalized, and a content pool including a personalized portion of the digital content may be created. The digital content may include includes a plurality of digital content items (e.g., digital photos or images) having metadata related to the present user.

The digital content may be personalized by assigning a relevance score to each of the plurality of digital content items based on, for example, one or more of metadata related to the respective digital content item, information indicating presence of an unauthorized user in the predefined space, and a configuration set by the device user; assessing whether the relevance score of each of the plurality of digital content items satisfies a threshold score requirement; and forming the personalized portion of the digital content based on each of the plurality of digital content items having the respective relevance score that satisfies the threshold score requirement. The personalized portion of the digital content may be provided from the content pool for rendering using an output device.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. The described functionality may be implemented in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of example approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the disclosure described herein.

The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

The term automatic, as used herein, may include performance by a computer or machine without user intervention; for example, by instructions responsive to a predicate action by the computer or machine or other initiation mechanism. The word "example" is used herein to mean "serving as an example or illustration." Any aspect or design described herein as "example" is not necessarily to be construed as preferred or advantageous over other aspects or designs.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such as an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a "configuration" may refer to one or more configurations and vice versa.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), unless the element is expressly recited using the phrase "means for" or, in the case of a method claim, the element is recited using the phrase "step for".

What is claimed is:

1. A method, comprising:
   obtaining, at a media device, identification information of a present user, the identification information of the present user identifying the present user;
   determining whether the identification information of the present user is associated with identification information pre-configured at the media device, wherein the identification information pre-configured at the media device includes a user account pre-configured at the media device;
   based on a determination that the identification information of the present user is associated with the identification information pre-configured at the media device, sending a content request to a data source for digital content related to the present user;
   responsive to the content request, receiving, at the media device, digital content related to the present user;
   responsive to receiving the digital content, personalizing, at the media device, the received digital content based at least in part on the present user, wherein the received digital content includes a plurality of digital content items; and
   providing, by the media device, a portion of the personalized received digital content.

2. The method of claim 1, further comprising:
   after providing the portion, determining whether a user is present with respect to the media device; and
   responsive to a determination that no user is present with respect to the media device:
      ceasing to provide digital content related to the present user; and
      providing generic digital content.

3. The method of claim 1, wherein:
   the data source is accessible by using the identification information pre-configured at the media device,
   the present user is different from a user associated with the identification information pre-configured at the media device, and
   the digital content stored in the data source is further related to the user associated with the identification information pre-configured at the media device.

4. The method of claim 1, based on a determination that the identification information of the present user is not associated with the identification information pre-configured at the media device, providing generic digital content.

5. The method of claim 1, further comprising:
   wherein the personalizing includes:
      assigning a relevance score to each of the plurality of digital content items;
      assessing whether the relevance score of each of the plurality of digital content items satisfies a threshold score requirement; and
      identifying the portion based on each of the plurality of digital content items having the respective relevance score that satisfies the threshold score requirement.

6. The method of claim 5, wherein the assigning the relevance score to each of the plurality of digital content items is based on metadata of the respective digital content item, wherein the metadata is related to the present user.

7. The method of claim 5, wherein the assigning the relevance score to each of the plurality of digital content items is based on whether an unidentified user is detected to be present with respect to the media device, the unidentified user having identification information that is not associated with the identification information pre-configured at the media device.

8. The method of claim 1, wherein the present user is a first present user, further comprising:
   obtaining, at the media device, identification information of a second present user who is different from the first present user, the identification information of the second present user identifying the second present user;
   determining whether the identification information of the second present user is associated with the identification information pre-configured at the media device;
   based on a determination that the identification information of the second present user is associated with the identification information pre-configured at the media device, sending a second content request to the data source for digital content related to both the first present user and the second present user;
   responsive to the second content request, receiving, at the media device, first updated digital content; and
   providing, by the media device, a portion of the first updated digital content.

9. The method of claim 8, based on a determination that the identification information of the second present user is not associated with the identification information pre-configured at the media device, providing, by the media device, an updated portion of the received digital content.

10. The method of claim 8, further comprising:
    after a determination that the identification information of the second present user is associated with the identification information pre-configured at the media device, determining that the first present user is no longer present with respect to the media device; and responsive to determining that the first present user is no longer present with respect to the media device, sending a third content request to the data source for digital content related to the second present user and not the first present user;

responsive to the third content request, receiving, at the media device, second updated digital content; and providing, by the media device, a portion of the second updated digital content.

11. The method of claim 8, further comprising:

after a determination that the identification information of the second present user is associated with the identification information pre-configured at the media device, determining that the second present user is no longer present with respect to the media device; and responsive to determining that the second present user is no longer present with respect to the media device, providing, by the media device, an updated portion of the received digital content.

12. The method of claim 1, wherein the user account pre-configured at the media device belongs to the present user.

13. The method of claim 1, wherein the identification information of the present user is obtained at the media device from an electronic device associated with the present user.

14. A device, comprising:

at least one processor; and a memory including instructions that, when executed by the at least one processor, cause the at least one processor to:

obtain identification information of a present user, the identification information of the present user identifying the present user;

determine whether the identification information of the present user is associated with identification information pre-configured at the device, wherein the identification information pre-configured at the device includes a user account pre-configured at the device;

based on a determination that the identification information of the present user is associated with the identification information pre-configured at the device, send a content request to a data source for digital content related to the present user;

responsive to the content request, receive digital content related to the present user;

personalize, at the device, the received digital content based at least in part on the present user, wherein the received digital content includes a plurality of digital content items; and provide a portion of the personalized received digital content.

15. The device of claim 14, wherein the instructions that, when executed by the at least one processor, further cause the at least one processor to:

after providing the portion, determine whether a user is present with respect to the device; and responsive to a determination that no user is present with respect to the device:

cease to provide digital content related to the present user; and provide generic digital content.

16. The device of claim 14, wherein the instructions that, when executed by the at least one processor, further cause the at least one processor to:

wherein to personalize the received digital content, the at least one processor is caused to:

assign a relevance score to each of the plurality of digital content items;

assess whether the relevance score of each of the plurality of digital content items satisfies a threshold score requirement; and identify the portion based on each of the plurality of digital content items having the respective relevance score that satisfies the threshold score requirement.

17. The device of claim 16, wherein a relevance score to each of the plurality of digital content items is assigned based on metadata of the respective digital content item, wherein the metadata is related to the present user.

18. The device of claim 16, wherein a relevance score to each of the plurality of digital content items is assigned based on whether an unidentified user is detected to be present with respect to the device, the unidentified user having identification information that is not associated with the identification information pre-configured at the device.

19. The device of claim 14, wherein the present user is a first present user, wherein the instructions that, when executed by the at least one processor, further cause the at least one processor to:

obtain identification information of a second present user who is different from the first present user, the identification information of the second present user identifying the second present user;

determine whether the identification information of the second present user is associated with the identification information pre-configured at the device;

based on a determination that the identification information of the second present user is associated with the identification information pre-configured at the device, send a second content request to the data source for digital content related to both the first present user and the second present user;

responsive to the second content request, receive first updated digital content; and provide a portion of the first updated digital content.

20. A non-transitory computer-readable medium comprising instructions, which when executed by at least one computing device, cause the at least one computing device to perform operations comprising:

obtaining, at a media device, identification information of a present user, the identification information of the present user identifying the present user;

determining whether the identification information of the present user is associated with identification information pre-configured at the media device, wherein the identification information pre-configured at the media device includes a user account pre-configured at the media device;

based on a determination that the identification information of the present user is associated with the identification information pre-configured at the media device, sending a content request to a data source for digital content related to the present user;

responsive to the content request, receiving, at the media device, digital content related to the present user;

personalizing, at the media device, the received digital content based at least in part on the present user, wherein the received digital content includes a plurality of digital content items; and providing, by the media device, a portion of the personalized received digital content.

21. The method of claim 1, wherein the media device is logged in to the user account pre-configured at the media device, and a stored credential associated with the user account is used to access the digital content related to the present user.

* * * * *